United States Patent
Tsukada (10) Patent No.: US 6,595,026 B1
(45) Date of Patent: Jul. 22, 2003

(54) METHOD OF PRODUCING PRESS-MOLDED PRODUCTS

(75) Inventor: Shogo Tsukada, Tokyo (JP)

(73) Assignee: Hoya Corporation, Tokyo (JP)

( * ) Notice: Subject to any disclaimer, the term of this patent is extended or adjusted under 35 U.S.C. 154(b) by 134 days.

(21) Appl. No.: 09/605,430

(22) Filed: Jun. 29, 2000

Related U.S. Application Data (60) Provisional application No. 60/140,985, filed on Jun. 29, 1999.

(51) Int. Cl.[7] .................................................. C03B 40/02
(52) U.S. Cl. .................................... 65/24; 65/61; 65/64
(58) Field of Search ............................. 65/24, 25.1, 61, 65/64

(56) References Cited

U.S. PATENT DOCUMENTS

| | | | | |
|---|---|---|---|---|
| 1,857,213 A | * | 5/1932 | Poundstone | 65/24 |
| 3,589,880 A | * | 6/1971 | Clark | 264/1.22 |
| 3,961,927 A | * | 6/1976 | Alderson et al. | 65/182.2 |
| 4,880,454 A | * | 11/1989 | Beningo | 65/169 |
| 5,334,476 A | * | 8/1994 | Yagi et al. | 430/110.2 |
| 5,713,975 A | * | 2/1998 | Schonfeld et al. | 65/104 |
| 5,762,673 A | * | 6/1998 | Hirota et al. | 65/122 |
| 5,873,921 A | * | 2/1999 | Hirota et al. | 65/102 |

FOREIGN PATENT DOCUMENTS

| | | | |
|---|---|---|---|
| JP | 2-142439 | | 12/1990 |
| JP | 9-118530 | * | 2/1999 |

* cited by examiner

*Primary Examiner*—Sean Vincent
(74) *Attorney, Agent, or Firm*—Sughrue Mion, PLLC

(57) ABSTRACT

A molten glass (8) is successively supplied from a nozzle (5) to a plurality of molding dies (7) and gradually cooled to form glass masses. Each glass mass is reheated in an air atmosphere to a temperature corresponding to a viscosity of $10^4$–$10^6$ poises and press-molded by a mold to produce a press-molded product. The press-molded product is polished to form a final glass product.

12 Claims, 6 Drawing Sheets

METHOD OF PRODUCING PRESS-MOLDED PRODUCTS

This application claims the benefit of Provisional application Ser. No. 60/140,985, filed Jun. 29, 1999.

BACKGROUND OF THE INVENTION

This invention relates to a method of producing glass products such as an optical glass and, in particular, to a method of producing glass products in which final glass products are obtained through a press-molding step using a mold and a polishing step subsequent thereto. This invention also relates to an apparatus for producing the glass products.

Generally, an optical glass as one of glass products can be produced by the following three methods.

First Method

A molten glass is press-molded by the use of a molding die to directly form a lens blank. Thereafter, the lens blank is polished.

Second Method

A molten glass is poured into a molding die to be molded into a prism-shaped or a plate-shaped glass block. The glass block is cut by mechanical machining into small cut pieces. The cut pieces are reheated and pressed to produce pressed products. Finally, the pressed products are subjected to polishing.

Third Method

A molten glass is formed into a preform having a shape approximate to that of a final product. The shape and surface precision of a mold is transferred to the preform to produce the final product.

Among the above-mentioned methods, the third method is free from polishing and is therefore adapted to production of a lens, such as an aspheric lens, having a shape difficult to polish. However, restriction is imposed upon a glass material which can be used in this method. Specifically, the viscosity of the glass material upon pressing must fall within a predetermined range between $10^8$ and $10^{12}$ poises. Furthermore, a large-scale and expensive production facility is required. This results in an increase in production cost.

Therefore, in order to produce a large amount of glass products at a reduced production cost, the first and the second methods are preferred.

Now, comparison will be made between the first and the second methods. The first method is adapted to small-item large-volume production but is not adapted to large-item small-volume production. This is because the molten glass must immediately be shaped into the glass blank. On the contrary, the second method is adapted to large-item small-volume production but is not adapted to small-item large-volume production. According to the second method, plate-shaped glass blocks of a plurality of kinds of glass materials can be preliminarily prepared and stored. When desired, a selected one of the plate-shaped glass blocks can be cut into cut pieces to be pressed.

Typically, the above-mentioned optical lens has been used in an optical apparatus, such as a camera using a photographic paper. In addition, the optical lens recently becomes widely used in electronic products (for example, a digital camera, a video camera, and a recording/reproducing device for a recording medium). With the arrival of a multi-media society, the volume of production of the optical lens used in the electronic products exhibits a drastic increase.

In order to enhance competitive power of a manufacturer of the optical glass, it is required to shorten a turn-around time (TAT) of the products in large-item large-volume production and to reduce the production cost. For this purpose, the second method has a potential success among the conventional methods mentioned above. For example, the second method is described in Japanese Unexamined Utility Model Publication (JP-U) No. H02-142439.

However, in the second method, the cut pieces to be reheated and pressed are obtained by molding the molten glass into the glass block of a plate-like shape and cutting the glass block. Therefore, it is difficult to suppress the variation in weight among the cut pieces.

This is because the weight control is performed at the time when the molten glass is poured into the molding die and molded into the plate-like shape. When the plate is cut into a plurality of blocks, the variation in weight is inevitably produced among the individual blocks. Furthermore, when the molten glass is molded into the plate-like shape, it is difficult to form a plate having a uniform thickness. This also contributes to the variation in weight.

Due to such variation in weight, it is impossible to reduce the grinding amount of the lens in the final polishing step. Therefore, the amount of a scrap material can not be decreased so that an adverse influence upon the environment can not be suppressed. At present, the technical progress in electric products is very rapid and even a new product becomes very quickly old-fashioned and disposed of. Under the circumstances, the influence of the scrap material upon the environment is a serious problem which can not be neglected.

Furthermore, since a glass mass is obtained by mechanical machining, limitation is imposed upon the reduction in production cost.

The use of the prism-shaped material results in another disadvantage. Specifically, during reheating thermal nonuniformity is caused between the corners and the center of the prism-shaped material. Therefore, upon pressing by the use of the mold, reproducibility with respect to the mold is deteriorated.

SUMMARY OF THE INVENTION

It is therefore an object of this invention to provide a method and an apparatus for producing glass products, which are capable of suppressing the production cost and which are adapted to large-item large-volume production.

It is another object of this invention to provide a method and an apparatus for producing glass products, which can suppress an adverse influence upon the environment.

It is still another object of this invention to suppress thermal nonuniformity when cut pieces are reheated and press-molded.

According to this invention, there is provided a method of producing glass products, comprising a glass mass forming step of forming glass masses by receiving a molten glass in a plurality of molding dies and gradually cooling the molten glass, a pressing step of reheating the glass masses in an air atmosphere to a temperature corresponding to a viscosity of $10^4$–$10^6$ poises and press-molding the glass masses by a mold to produce press-molded products, and a polishing step of polishing the press-molded products to form final glass products.

Preferably, the molten glass in the glass mass forming step has a viscosity of 30–2 poises.

Preferably, the glass mass is made of a glass having a glass transition point Tg of 580° C. or more.

Preferably, the pressing step is performed by reheating the glass mass after subjected to polishing to increase the surface roughness.

Preferably, the pressing step is performed by applying a powdery parting agent on the surface of the glass mass after subjected to polishing.

Preferably, the pressing step is performed by reheating the glass mass by heat radiation.

Preferably, in the glass mass producing step, the molten glass continuously supplied is received by the molding dies heated to a predetermined temperature and successively fed, and is molded to form the glass masses.

Preferably, the molten glass is cut when the weight of its lower end portion flowing down exceeds the surface tension of the molten glass.

Preferably, the molten glass is molded in the molding dies into the glass masses in a floating or a substantially floating state.

Preferably, a cutting time of the molten glass is not longer than 1.0 second.

The glass products may be optical products.

According to this invention, there is also provided a method of producing press-molded products, the method being for distributing a plurality of glass masses to a plurality of molds and press-molding the glass masses to obtain press-molded products of different shapes, the method comprising the steps of a glass mass forming step of receiving a predetermined weight of molten glass in a molding die to form a glass mass, repeating the glass mass forming step to produce a plurality of glass masses, and distributing the glass masses to the molds, and press-molding by each mold the glass masses reheated to a temperature corresponding to a viscosity between $10^4$ and $10^6$ poises to obtain the press-molded products of different shapes.

Preferably, the molding die receives the molten glass in a floating or a substantially floating state to form the glass mass.

According to this invention, there is also provided a method of producing glass products, comprising the steps of producing press-molded products by the use of the above-mentioned method and polishing the press-molded products to obtain final glass products. The glass products may be optical products.

According to this invention, there is also provided an apparatus for producing a glass mass, the apparatus realizing a glass mass forming step in the above-mentioned method of producing glass products, the apparatus comprising a molten glass supply unit for supplying a molten glass through a nozzle, a molding unit for molding the molten glass, and heating means for heating the molding die and the molten glass to a predetermined temperature, wherein the molding unit includes a plurality of molding dies having molding surfaces for molding the molten glass supplied thereto into a predetermined shape, and transferring means for successively transferring the molding dies one by one to a lower end portion of the nozzle in an indexed manner.

According to this invention, there is also provided an apparatus for producing a glass mass, the apparatus comprising a molten glass supply unit for supplying a molten glass through a nozzle, a molding unit for molding the molten glass, and heating means for heating the molding dies and the molten glass to a predetermined temperature, the molding unit including a plurality of molding dies having molding surfaces for molding the molten glass supplied thereto into a predetermined shape, and transferring means for successively transferring the molding dies to a lower end portion of the nozzle in a continuous manner.

Preferably, the transferring means is a turntable rotated by driving means.

Preferably, the driving means for driving the turntable has a rotation speed controlled with reference to the viscosity of the molten glass.

Preferably, the molding surface of the molding die is provided with at least one gas supply hole for floating up the molten glass.

Preferably, each of the molding dies is arranged to be movable away from and towards the nozzle, the molding die being controlled to move towards the nozzle upon receiving the molten glass and to move away from the nozzle upon cutting the molten glass being received.

According to this invention, there is also provided a method of producing glass products, comprising the steps of forming glass masses by receiving a molten glass in a plurality of molding dies and gradually cooling the molten glass and reheating the glass masses in an air atmosphere to a temperature corresponding to a viscosity of $10^4$–$10^6$ poises and press-molding the glass masses by the mold to produce press-molded products.

Preferably, the above-mentioned method further comprises the step of polishing the press-molded products to form final glass products.

DESCRIPTION OF THE PREFERRED EMBODIMENT

Now, description will be made about this invention in conjunction with a preferred embodiment thereof with reference to the drawing.

Apparatus for Producing Glass Mass

Figure 1:
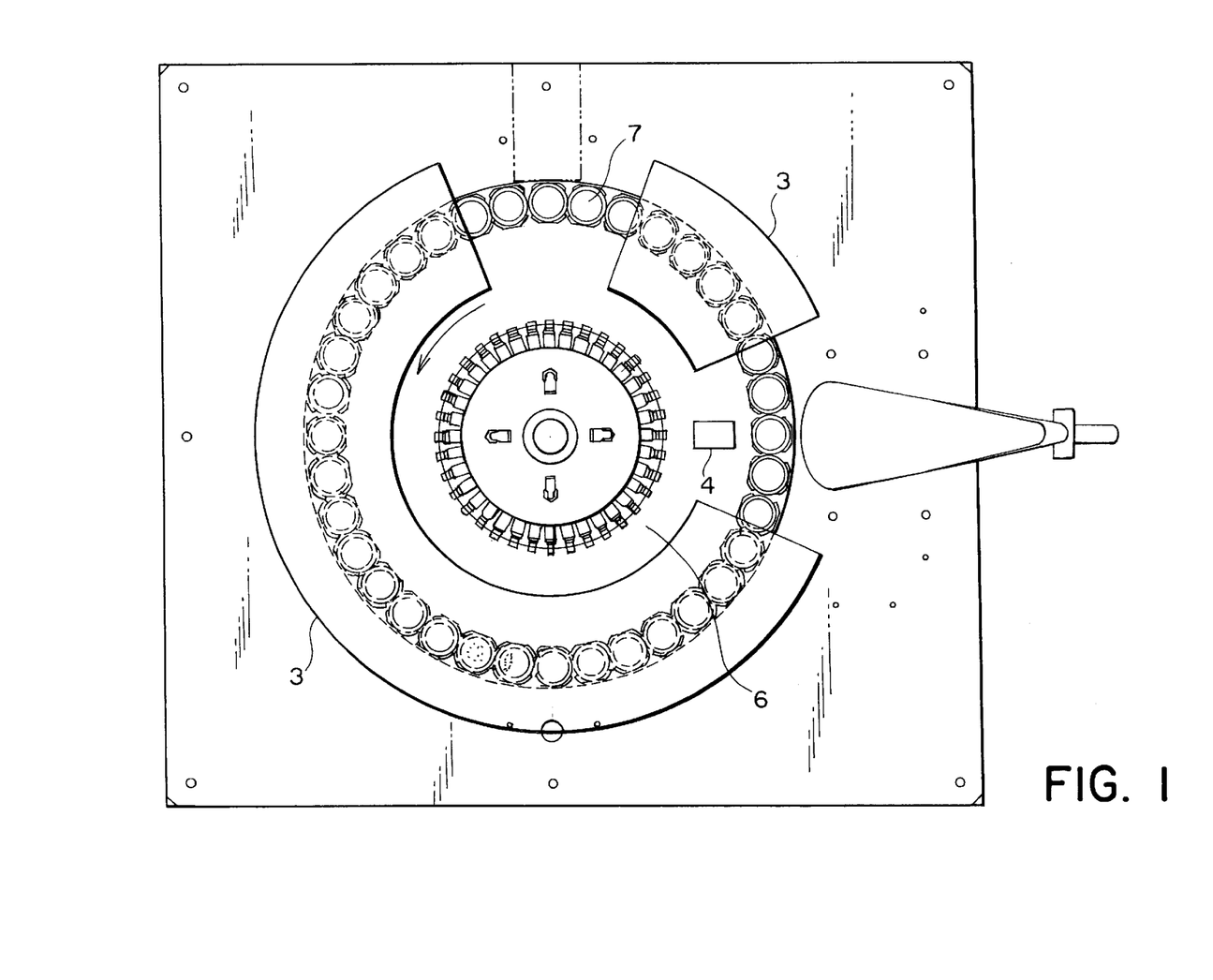
FIG. 1 is a plan view of a glass mass producing apparatus according to an embodiment of this invention.
Figure 2:
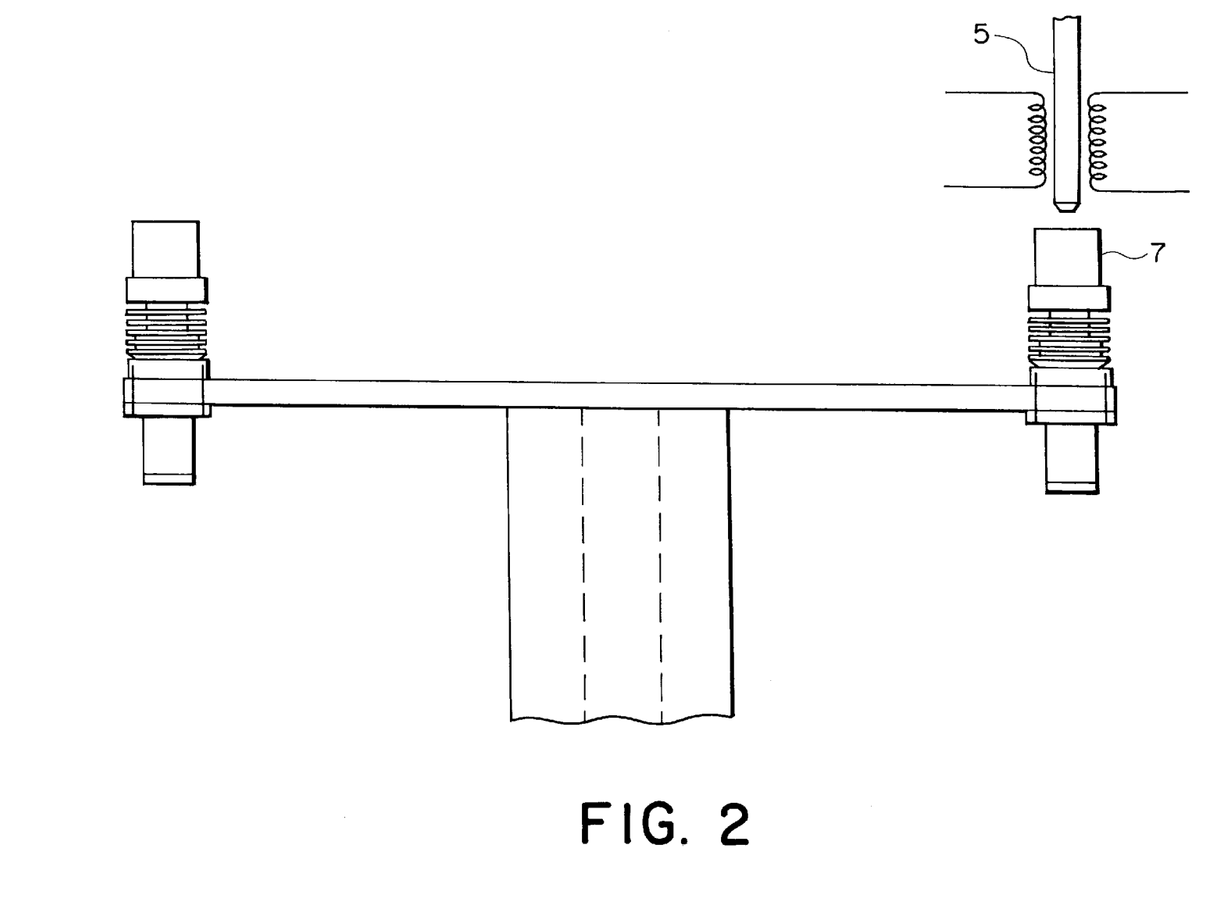
FIG. 2 is a side view of the apparatus illustrated in FIG. 1.
Figure 3:
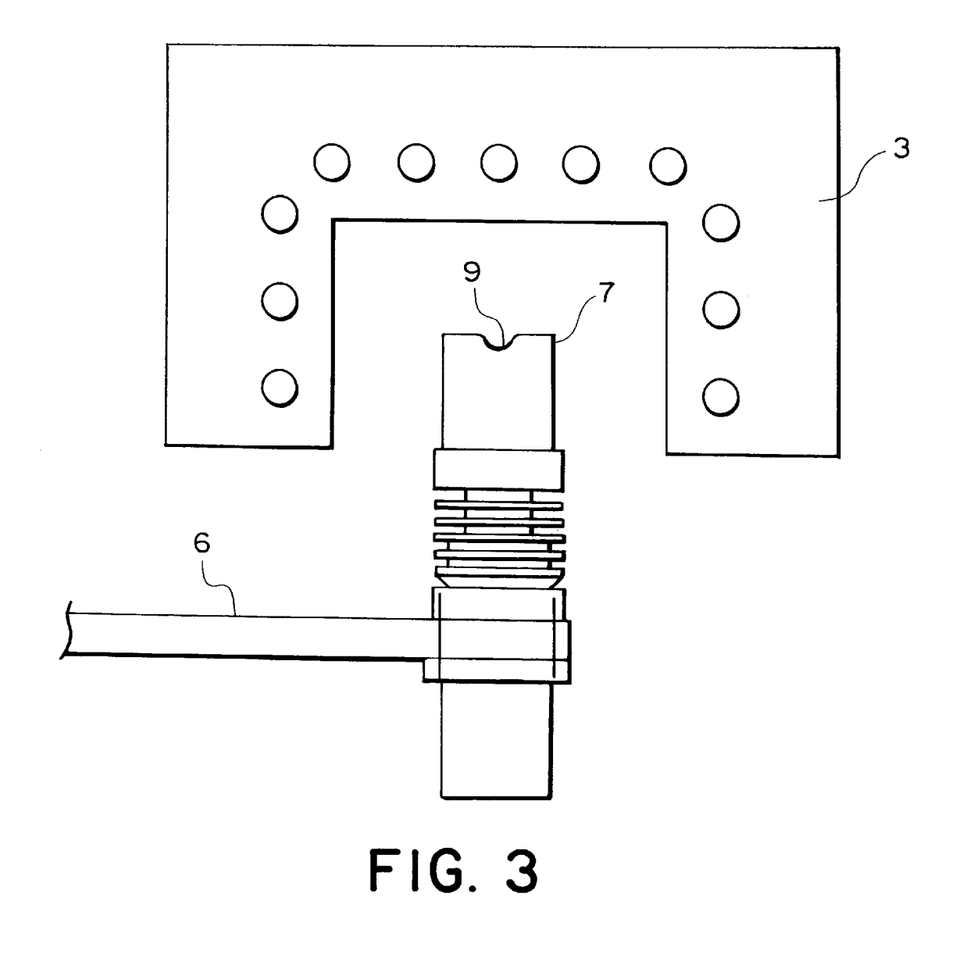
FIG. 3 is a view showing a molding die in a heating furnace.

Referring to FIGS. 1 through 3, a glass mass producing apparatus according to an embodiment of this invention comprises a molten glass supply unit 1 for supplying a molten glass 8 to a molding die 7, a molding unit 2 for molding the molten glass 8 flowing down from the molten glass supply unit 1, a heating furnace 3 for heating the molding die 7 and for gradually heating and cooling the molten glass 8, and an unloading unit 4.

The molten glass supply unit 1, the heating furnace 3, and the unloading unit 4 are arranged at fixed positions.

The molten glass supply unit 1 is a device for supplying the molten glass 8 melted in a melting furnace to the molding die 7 of the molding unit 2 through a nozzle 5. The nozzle 5 is provided with a temperature controller to control the temperature of the molten glass 8 supplied through the nozzle 5 so that the molten glass 8 has a predetermined viscosity. By the above-mentioned control, productivity can be controlled.

The heating furnace 3 is formed along a path of movement of the molding die 7 on a turntable 6 and comprises two separate parts one of which is formed between the molten glass supply unit 1 and the unloading unit 4 and the other of which is formed between the unloading unit 4 and the molten glass supply unit 1. The heating furnace 3 has a tunnel-like shape and has a heater member arranged therein to heat the molding die 7 and the molten glass 8 passing through the heating furnace 3. The temperature in the heating furnace 3 is selected to be 350–400° C.

The unloading unit 4 is for unloading the molten glass 8 cooled down to a temperature not higher than a glass transition point Tg by blowing the air from a lateral side thereof. The unloading unit 4 is located at a position forming an angle of about 270 degrees from the molten glass supply unit 1.

The molding die 7 and the molten glass 8 are transferred by the molding unit 2 successively to the molten glass supply unit 1, the heating furnace 3, and the unloading unit 4 located at the fixed positions mentioned above.

The molding unit 2 comprises the turntable 6 of a disk-like shape having a diameter of 500 mm and a thickness of 15 mm, and a plurality of (36 in the illustrated example) molding dies 7 located at an equiangular interval along an outer periphery of the turntable 6. The turntable 6 is made of an aluminum alloy and rotated by a direct drive motor.

Each of the molding dies 7 is attached to each of a plurality of holes formed in the turntable 6 at an equiangular interval along the outer periphery thereof and is vertically movable in a thickness direction of the turntable 6. The molding die 7 is provided with a roller at its lower end. On the other hand, the turntable 6 is provided with a generally right-triangular cam formed below the molding die 7 at a position corresponding to the nozzle 5 of the molten glass supply unit 1 to guide the roller of the molding die 7. Thus, the molding die 7 gradually moves upward and approaches the nozzle 5 until the molten glass 8 is received and, after receiving the molten glass 8, quickly moves down away from the nozzle 5.

Figure 5:
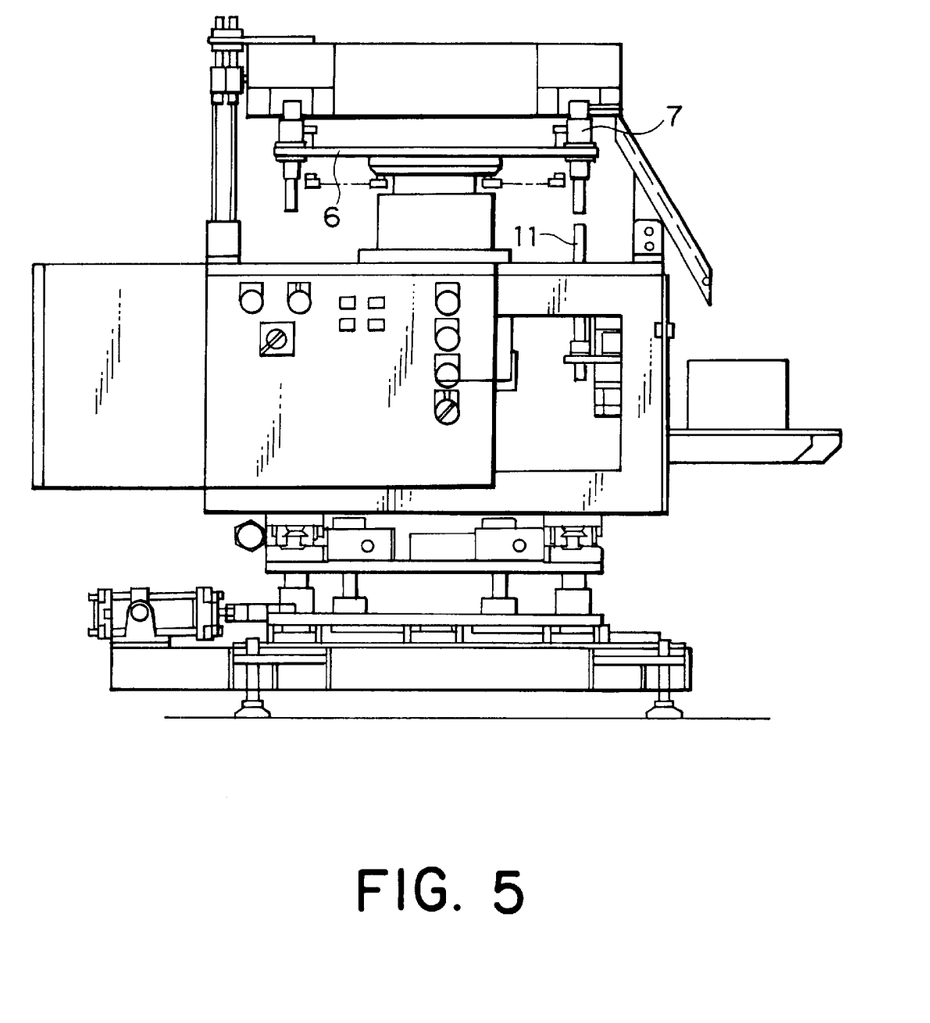
FIG. 5 is a side view of a glass mass producing apparatus according to a second embodiment of this invention.

Temporarily referring to FIG. 5, the turntable 6 and the molding die 7 may be driven in a different manner by a glass mass producing apparatus according to a second embodiment of this invention. The molding die 7 is transferred to a receiving position where the molten glass 8 flowing out from the nozzle 5 is received. The molding die 7 is stopped at the receiving position to receive the molten glass 8. After the molten glass 8 is received, the molding die 7 is transferred from the receiving position. The above-mentioned step is repeatedly carried out. To carry out the above-mentioned step, the turntable 6 is rotated by a predetermined angle and then stopped by intermittently driving the direct drive motor. Therefore, this approach is called an intermittent index technique. When the turntable 6 is stopped and the molding die 7 reaches the receiving position, the molding die 7 is pushed up by a push-up rod 11 and moves upward to receive the molten glass 8. At the time instant when the molten glass 8 in a predetermined amount is supplied, the push-up operation by the push-up rod 11 is released so that the molding die 7 is quickly moved down to return to an initial height before the push-up operation. Simultaneously, the turntable 6 is rotated to transfer a next molding die 7 to the receiving position.

In the glass mass producing apparatus of the first embodiment, the rotation of the turntable 6 serves to drive the vertical movement of the molding die 7. Simply by rotating the turntable 6, the molding die 7 climbs along the cam to move upward and, after receiving the molten glass 8, is separated from the cam to quickly move down so that a predetermined amount of the molten glass 8 is received. Therefore, it is unnecessary to stop the turntable 6 and to control the movement of the push-up rod 11 in synchronism with the rotation of the turntable 6. As compared with the apparatus of the second embodiment, the apparatus of the first embodiment can produce a glass mass at a high speed.

On the other hand, in the apparatus of the second embodiment, the molding die 7 is moved only in the vertical direction when the molten glass 8 is received in the molding die 7. Therefore, this apparatus is advantageous in that the glass mass is substantially free from folding which might be produced upon cutting the molten glass 8.

The molding die 7 has a molding surface 9 formed on its upper surface and shaped into a concave surface. The molding surface 9 serves to define an outer diameter of the molten glass 8 as it is seen in a plan view. The molding surface 9 does not define the shape of the surface (section of the molten glass 8) corresponding to a primary surface of the lens. Thus, the glass mass of this invention is defined for the weight and the outer diameter in the plan view but is not defined for the sectional shape. This is because the viscosity in the reheating step as a next step is between $10^4$ and $10^6$ poises and the glass mass is substantially soft so that the molding of the sectional shape at this stage is unnecessary.

The molding surface 9 is provided with gas supply holes formed at its center to supply a gas, such as air. The gas serves to float up the molten glass 8. The flow rate of the gas flowing out from the gas supply holes is equal to 0.5 litter/minute. The molding die 7 is made of a light-weight carbon material so that the turntable 6 can be rotated at a high speed.

Consideration will be made of the positional relationship between the molten glass supply unit 1 and the molding unit 2. The molten glass supply unit 1 and the molding unit 2 are arranged so that the molding dies 7 on the turntable 6 pass through a position below the nozzle 5 of the molten glass supply unit 1. Therefore, by rotating the turntable 6, the molding dies 7 are successively delivered to the position below the nozzle 5. The molten glass 8 fed from the nozzle 5 continuously flows down. The rotation of the turntable 6 is controllably driven so that the molten glass 8 continuously flowing down from the nozzle 5 can be successively received by the molding dies 7 by a predetermined weight. The rotation of the turntable 6 is controlled with reference to the viscosity of the molten glass 8 flowing down from the nozzle 5. The molten glass 8 supplied from the molten glass supply unit 1 to each molding die 7 is gradually cooled and molded into the glass mass while it is transferred by the turntable 6. The glass mass is unloaded by the unloading unit 4 upon reaching a position slightly before the molten glass supply unit 1 at the fixed position. The molding dies 7 which become empty pass through the heating furnace 3 again and are kept at a predetermined temperature to ready to receive a new molten glass 8 from the molten glass supply unit 1.

Glass Used

In the above-mentioned third method, the final product is prepared by press molding. In this event, even a very small fracture of the mold would result in a defective molding product because the shape of a fracture portion is transferred to the glass product. Therefore, it is necessary to minimize the fusion between the glass and the mold upon pressing, which would cause small fracture of the mold. Under the circumstances, the third method (mentioned in the preamble of the instant specification) is applied only to the molding of those glasses having a viscosity between $10^8$ and $10^{12}$ poises upon pressing at a relatively low temperature. In view of the above, those glasses having a glass transition point Tg lower than 580° C. are usable in the third method.

On the other hand, the method of this invention allows the press-molding of glasses even if the glass transition point Tg is not lower than 580° C. By a subsequent polishing step, optical products can be manufactured. The method of this invention is preferable to produce the optical products from the glasses having a glass transition point Tg not lower than 590° C., more preferable to produce the optical products from the glasses having a glass transition point Tg not lower than 600° C., and most preferable to produce the optical products from the glasses having a glass transition point Tg not lower than 610° C.

Tables 1 and 2 show optical glass materials appropriate for this invention. By using the optical glass materials, the molten glass is successively supplied from the nozzle and the glass mass is obtained without devitrification.

When the molten glass flows out from the nozzle, the viscosity of the glass is preferably between 30 and 2 poises. Herein, use is preferably made of the glass exhibiting this viscosity range at a temperature between 900 and 1200° C. More preferably, use is made of the glass exhibiting this viscosity range at a temperature between 950 and 1200° C. Most preferably, use is made of the glass exhibiting this viscosity range at a temperature between 950 and 1150° C.

In order to prevent the viscosity of the glass from becoming excessively high in the above-mentioned temperature range, the content of $SiO_2$ is preferably equal to 50 wt % or less, more preferably 40 wt % or less.

TABLE 1

| Preferred Glass | Preferred Glass Composition | More Preferred Glass | Glass Transition Point (° C.) | Temperature Corresponding to Viscosity of 30-2 Poises (° C.) |
|---|---|---|---|---|
| SiO2—TiO2 Optical Glass (containing SiO2 and TiO2 in amounts predominant over other components) | SiO2 15–40 wt % TiO2 15–45 wt % Na2O 0–25 wt % CaO 0–10 wt % BaO 0–30 wt % ZrO2 0–10 wt % Nb2O5 0–25 wt % | Optical Glass consisting of SiO2, TiO2, Na2O, CaO, BaO, ZrO2, Nb2O5 (Nos. 1 and 2 in Table 2) | 580–700 | 1000–1150 |
| B2O3—La2O3 Optical Glass (containing B2O3 and La2O3 in amounts predominant over other components) | B2O3 15–70 wt % La2O3 10–50 wt % SiO2 0–25 wt % Gd2O3 0–50 wt % ZnO 0–56 wt % BaO 0–50 wt % SrO 0–40 wt % CaO 0–25 wt % MgO 0–20 wt % Al2O3 0–20 wt % ZrO2 0–10 wt % TiO2 0–10 wt % Nb2O5 0–15 wt % WO3 0–10 wt % Y2O3 0–20 wt % Ta2O5 0–30 wt % | Optical Glass consisting of SiO2, CaO, ZnO, ZrO2, Sb2O3 (No. 3 in Table 2) Optical Glass consisting of B2O3, La2O3, SiO2, CaO, BrO, ZnO, ZrO2, As2O3 (No. 4 in Table 2) Optical Glass consisting of B2O3, La2O3, SiO2, ZnO, Gd2O3, ZrO2, Nb2O5 (No. 5 in Table 2) Optical Glass consisting of B2O3, La2O3, SiO2, Y2O3, Gd2O3, ZrO2, Nb2O5 (No. 6 in Table 2) Optical Glass consisting of B2O3, La2O3, SiO2, BaO, Y2O3, Gd2O3 (No. 7 in Table 2) Optical Glass consisting of B2O3, La2O3, SiO2, ZnO, Gd2O3, ZrO2, Nb2O5, Ta2O5 (No. 8 in Table 2) Optical Glass consisting of B2O3, La2O3, SiO2, ZrO2, TiO2, Nb2O5, WO3, Sb2O3, (No. 9 in Table 2) Optical Glass consisting of B2O3, La2O3, SiO2, Al2O3, BaO, ZnO, ZrO2, Nb2O5, WO3 (No. 10 in Table 2) | 580–700 | 1000–1150 |

TABLE 2

| Sample No. | Glass | Tg (° C.) | Ts (° C.) | Temperature of Glass Flow (° C.) | Viscosity of Glass Flow (poise) | Glass Mass Forming Mold Temperature (° C.) | Cooling Temperature (° C.) | Reheating Temperature (° C.) | Viscosity upon Reheating (poise) | Weight Accuracy of Glass Mass (prior to polishing) | Rmax of Glass Mass Before Barrel Polishing | Rmax of Glass Mass After Barrel Polishing | Glass Products Prepared |
|---|---|---|---|---|---|---|---|---|---|---|---|---|---|
| 1 | SiO2—TiO2 | 615 | 650 | 1100 | 5 | 250–300 | 565 | 850 | $10^5$ | ±5% | upper surface | upper and lower surface | biconvex lens |
| 2 | SiO2—TiO2 | 620 | 660 | 1150 | 5 | 250–300 | 570 | 850 | $10^5$ | ±5% | 5–30 nm | 40 μm | biconcave lens |
| 3 | B2O3-La2O3 | 640 | 670 | 1005 | 11 | 250–300 | 590 | 850 | $10^5$ | ±5% | lower surface | | plano-convex lens |
| 4 | B2O3-La2O3 | 645 | 675 | 1050 | 8 | 250–300 | 595 | 850 | $10^5$ | ±5% | 3–60 nm | | plano-concave lens |
| 5 | B2O3-La2O3 | 660 | 695 | 1035 | 10 | 250–300 | 610 | 860 | $10^5$ | ±5% | | | |
| 6 | B2O3-La2O3 | 680 | 710 | 1060 | 10 | 250–300 | 630 | 870 | $10^5$ | ±5% | | | convex-meniscus lens |
| 7 | B2O3-La2O3 | 680 | 710 | 1035 | 10 | 250–300 | 630 | 870 | $10^5$ | ±5% | | | |
| 8 | B2O3-La2O3 | 670 | 700 | 1035 | 10 | 250–300 | 620 | 870 | $10^5$ | ±5% | | | |
| 9 | B2O3-La2O3 | 590 | 625 | 950 | 10 | 250–300 | 540 | 800 | $10^5$ | ±5% | | | concave-meniscus lens |
| 10 | B2O3-La2O3 | 625 | 665 | 950 | 14 | 250–300 | 615 | 870 | $10^5$ | ±5% | | | |
| 11 | B2O3-La2O3 | 570 | 600 | 950 | 8 | 250–300 | 520 | 720 | $10^5$ | ±5% | | | |
| 12 | SiO2—TiO2 | 550 | 585 | 930 | 7 | 250–300 | 500 | 700 | $10^5$ | ±5% | | | |

In the second method, weight accuracy of glass mass (prior to barrel polishing) is more than ±10%.
Tg: glass transition point
Ts: sag temperature In order to prevent the viscosity of the glass from becoming excessively low in the above-mentioned temperature range, the content of $B_2O_3$ is preferably equal to 15 wt % or more, more preferably 20 wt % or more.

Specifically, use is advantageously made of those glasses of the composition types or systems given in Table 1 and those glasses having preferred compositions included therein.

Method of Producing Glass Mass

Next, description will be made about a method of producing the glass mass according to this invention by the use of the glass mass producing apparatus described above.

At first, an $SiO_2$-$TiO_2$ optical glass material (Glass 1 in Table 2) is melted in the melting furnace at 1270° C.

After completion of melting of the glass, the molten glass 8 is supplied from the melting furnace to the molten glass supply unit 1. The molding die 7 is heated by the heating furnace 3 to a temperature between 250 and 300° C. The turntable 6 is continuously rotated at 2.5 r.p.m. The end portion of the nozzle 5 is controlled to a temperature of 1110° C. At this time, the molten glass has a viscosity of 5 poises.

Herein, when the molten glass 8 flows out from the nozzle 5, the viscosity of the molten glass 8 is preferably between 30 and 2 poises, more preferably 20 and 2 poises. By selecting the viscosity of the molten glass 8 within the above-mentioned range, the glass mass free from striae and excellent in internal quality is obtained. In addition, it is easy to cause an appropriate amount of the molten glass 8 to flow out of the nozzle 5. Furthermore, when a predetermined amount of the molten glass 8 flows out, constriction is formed in the molten glass 8 between its lower end and its upper part around the nozzle 5. When the weight of the lower end of the molten glass 8 exceeds the surface tension of the molten glass 8, the lower end of the molten glass 8 is separated at the constriction. Thus, a predetermined weight of the molten glass is easily received in the molding die 7. Furthermore, the weight of the molding die 7 can be adjusted by changing the timing of quickly moving down the molding die 7 receiving the lower end of the molten glass 8 flowing out from the nozzle 5. After receiving the molten glass 8 in the molding die 7, molding can easily be carried out in a floating state or a substantially floating state.

Figure 4:
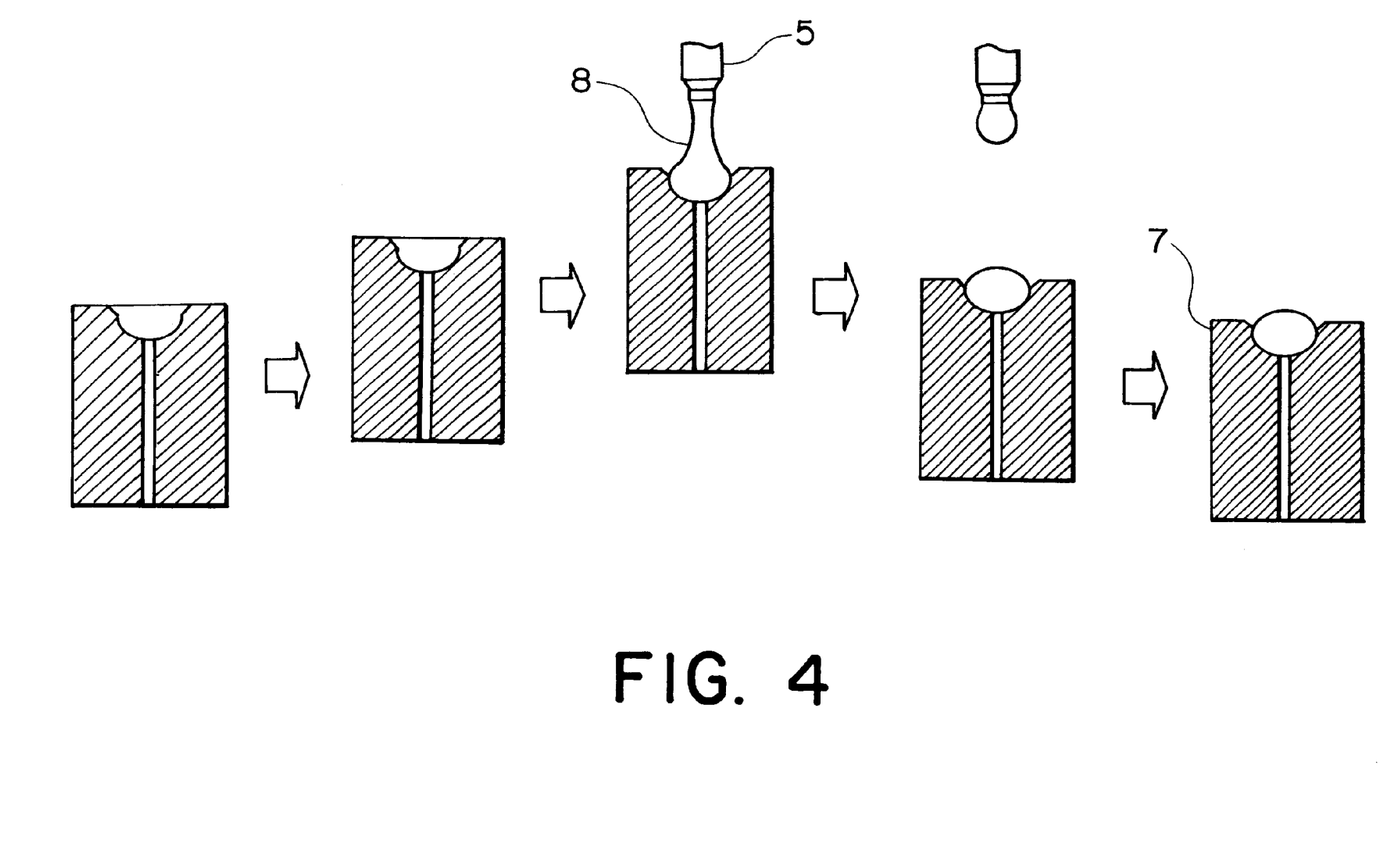
FIG. 4 is a view for describing a cutting operation of a molten glass.

In the above-mentioned state, the molten glass 8 is continuously supplied from the nozzle 5. As illustrated in FIG. 4, when the molten glass 8 is supplied from the nozzle 5, the molding die 7 moves upward from its standing position to receive on the molding surface 9 the molten glass 8 supplied from the end portion of the nozzle 5. Having received the molten glass 8 on the molding surface 9, the molding die 7 quickly moves down to cut the molten glass 8 supplied from the nozzle 5. The cutting is caused by a combination of forces in a rotating direction and a descending direction (in case of the apparatus according to the first embodiment mentioned above) or by reduction of supporting force supporting the molten glass 8 resulting from downward movement of the molding die 7 (in case of the apparatus according to the second embodiment mentioned above). The time required for the cutting is equal to about 0.3 second. As to the weight control for the glass mass in this invention, the molten glass 8 flowing down or dropping down from the nozzle 5 at a predetermined flow rate is received by the molding dies 7 at a predetermined regular interval in order to achieve the uniformity in weight.

The setting of the weight of the glass mass is carried out in the following manner. At first, the temperature of the molten glass 8 is selected to obtain the viscosity such that the glass mass excellent in internal quality is obtained without striae. Next, the amount of the molten glass 8 flowing out from the nozzle 5 within a unit time period is determined as a flow amount. The nozzle 5 is selected which has an inner diameter (preferably 1–5 mm φ, more preferably 2–5 mm φ) such that the flow amount determined as mentioned above is obtained. Furthermore, the transfer speed of the molding die 7, i.e., the rotation speed of the turntable is selected so that the molding die 7 receives a desired amount of the molten glass 8 flowing out at a predetermined rate. Thus, by selecting the viscosity of the molten glass 8 within a range between 30 and 2 poises and by adjusting the transfer speed of the molding die 7, the cutting time of the molten glass 8 can be reduced to 1.0 second or less at a proper descending timing of the molding die 7. Therefore, a large amount of the glass mass can be quickly produced at a high productivity and with a high weight accuracy.

In this embodiment, no cutter is used as described above. Therefore, a cutting mark (folding) formed upon cutting does not reach the depth of the glass mass. In other words, the cutting mark (folding) formed upon separation of the molten glass 8 is within a surface layer having a thickness of about 0.5 mm from the surface of the glass mass and, therefore, can easily be removed by polishing the surface of the glass mass.

Typically, the glass mass has one of the following configurations.

(1) A spherical shape or a similar shape (2) A shape having a peripheral edge and two convex surfaces connected to each other with the peripheral edge interposed therebetween, or a similar shape.

This shape corresponds to a marble-like shape and a spheroid (ellipsoid of revolution) obtained by rotating an ellipse around a short axis as a rotation axis. In other words, a shape having a circular shape or a generally circular shape when the glass mass is seen in a plan view in the state that a part defining an outer diameter of the glass mass coincides with the peripheral edge.

(3) A shape formed by a drop of liquid floating up

In the above-mentioned manner, the molten glass 8 is successively supplied from the nozzle 5 to a plurality of the molding dies 7 rotating in a circumferential direction.

The molten glass 8 supplied to the molding dies 7 is floated up or substantially floated up by the gas (for example, air) delivered through the gas supply hole in the molding surface 9. Simultaneously, the molten glass 8 is heated in the heating furnace 3 and moves in the circumferential direction to be gradually cooled and formed into a predetermined shape. The glass being floated up may be rotated around the vertical axis by adjusting the diameter of the molding die and the amount of the molten glass supplied thereon but is never inverted in the vertical direction. Therefore, the glass mass has an upper surface and a lower surface which are kept faced upward and downward during the molding in a floating or a substantially floating state, respectively. In case of the molding in a substantially floating state, the lower surface may be brought into contact with the inner surface of the molding die to partially leave a non-free surface. On the other hand, the upper surface has a less or no chance of contact with the molding die and forms a free surface in its most part. This results in a difference in surface roughness between the upper and the lower surfaces.

During the molding, the sectional shape of the molten glass 8 is not restricted but is amorphous. When the glass mass is cooled down to a temperature lower than a glass transition point Tg (615° C.) and moved to an unloading position, it is unloaded. In the above-mentioned manner, glass masses are produced at a productivity of 90 pieces/second.

The glass mass produced in this embodiment often has striae in its surface layer portion (between the surface and the depth of 0.2 or 0.5 mm from the surface). However, these striae can be easily removed by polishing in a later step.

The variation in weight was ±5% (for 1000 samples).

Herein, it is to be noted in connection with this invention that the above-mentioned step of producing the glass mass is different from that executed in the third method (mentioned before) in the following respects.

As a descending speed of the molding die 7 increases, the folding mark is liable to occur on separating the molten glass. It has been found out that such folding mark frequently appears when a cutting time of the molten glass is equal to one second or less. Such appearance of the folding mark could be suppressed by lengthening the cutting time to three seconds or more, According to this invention, even if the glass mass has the folding mark, a proposal has been offered by removing a defective portion due to the folding mark by carrying out polishing after press molding. Alternatively, when barrel polishing is performed prior to the press molding, the defective portion due to the folding mark can be removed by the barrel polishing. Thus, this invention allows the presence of the folding mark within a range corresponding to a removable amount to be removed in polishing. Therefore, the above-mentioned cutting time can be shortened to a period of 1.0 second or less to thereby improve the productivity.

In the third method mentioned as one of the conventional method, the glass mass is press-molded into the final product without any polishing. Even if application is made about the third method of molding the glass mass from the molten glass without any polishing, it must be required to suppress the occurrence of a defect resulting from the contact between the glass and the molding die. In order to suppress the occurrence of the defect resulting from the contact, any attempts have been made neither about moving the molding die at a high speed with the glass floating on the molding die nor about quickly accelerating or decelerating the molding die. Practically, it has been found out that, in the method of successively receiving the molten glass flowing down from a single nozzle on a plurality of molding dies, the number of glass masses which can be received per minute is limited to about 30 in number, so as to lower the molding dies and to thereby cut the molten glass without any defect.

According to this invention, however, even if the glass is contacted with the molding die 7 and, as a result, each glass mass has the defect on the surface thereof due to the contact, such defect can be removed by the subsequent polishing. Such polishing makes it possible to move the molding die at a high speed with the molten glass received thereon or to quickly accelerate/decelerate the molding die. Therefore, the molten glass flowing down from the single nozzle can be successively or continuously received on a plurality of molding dies and can be quickly cut into the glass masses more than 60 per minute in number by rapidly lowering the molding dies. Practically, it is preferred in this invention to control the production speed of glass masses per nozzle within a range between 80/minute and 200/minute.

Polishing Step of Polishing Glass Mass

The polishing step of polishing the surface of the glass mass prior to press molding is optional but is preferable in the following respects.

(1) The weight accuracy of the glass mass obtained from the molten glass is higher than that of the glass material (cut pieces) to be pressed in the above-mentioned second method. Even if the glass mass is not subjected to the polishing, a sufficiently high weight accuracy can be obtained. However, in order to achieve a high accuracy in thickness of the press-molded product if necessary, the surface layer of the glass is removed to control the weight of the glass mass.

(2) In this invention, press molding is carried out by reheating to a relatively high temperature (as compared with the above-mentioned third method) such that the glass viscosity is between $10^4$ and $10^6$ poises. Therefore, it is necessary to avoid the fusion between the mold and the glass. In order to avoid the fusion at such a high temperature, a powdery parting agent such as boron nitride is applied onto the surface of the mold and the glass mass. In the third method, the press-molded product is a final product.

Therefore, in order to avoid occurrence of the fusion, the molding surface of the mold may be provided with a parting film or the glass material may be subjected to surface treatment. Thus, in the third method, the powdery parting agent which would deteriorate the surface profile accuracy is not used. On the other hand, in the first method, the powdery parting agent may be applied onto the molding surface of the mold. However, the parting agent is not applied onto the surface of the glass material because the glass material is supplied in a molten state.

On the other hand, it is preferred in this invention that the powdery parting agent is applied onto the surface of the glass mass because of the above-mentioned reasons. However, a part or a whole of the surface of the glass mass obtained by molding the molten glass in a floating or a substantially floating state forms a smooth free surface and, therefore, the powdery parting agent is not sufficiently attached to the surface of the glass mass Even in a portion not forming the free surface, the surface roughness is not uniform so that the parting agent is not uniformly attached. Therefore, by polishing the surface of the glass mass, the surface roughness is rendered coarser than that of the free surface and uniform. In this manner, the powdery parting agent is uniformly attached.

(3) During the molding in a floating or a substantially floating state, any substance may be volatilized from the glass adhered to the molding die or any foreign substance may be volatilized. Such volatilized substance will be attached to the surface of the glass mass to cause attachment of the foreign substance or occurrence of a defect on the surface of the glass mass. In addition, the undesirable mark may be formed on the surface layer upon separation of the lower end of the molten glass flowing out from the nozzle. Such defect can be removed by polishing prior to press molding.

(4) The surface of the glass mass obtained by molding the molten glass in a floating or a substantially floating state partially forms a free surface portion, as described in the foregoing, and partially forms a less coarse portion having a relatively small surface roughness although it is not the free surface portion. These portions are transparent and poor in light scattering on the surface. In order to reheat the glass mass for the purpose of press molding, a method of heating the glass mass placed in a heatproof material by the use of a heater arranged above is excellent in view of the simplicity and the ability of heating a large amount of glass. However, in this method, heat radiation is not scattered on the surface of the glass mass. In this event, a part of the heat which is not absorbed in the glass may reach the contacting area between the glass and the heatproof material. This results in fusion of the glass and the heatproof material. Taking the above into consideration, the surface of the glass mass is polished so that the heat radiation is scattered on the glass surface and the contacting area between the glass and the heatproof material is prevented from excessive heating. Thus, the above-mentioned fusion can be avoided.

The above-mentioned objects can be achieved by polishing the surface of the glass mass.

Prior to polishing, the glass mass has a maximum surface roughness approximately between 2 and 30 nm for the upper surface and between 2 and 60 nm for the lower surface. The surface of the glass mass is polished to increase the surface roughness of the glass mass. In order to achieve the above-mentioned objects (1) through (4), particularly, (2) through (4), the glass mass after polishing must have a maximum surface roughness Rmax within a range preferably between 20 and 60 $\mu$m, more preferably between 30 and 50 $\mu$m, most preferably between 35 and 45 $\mu$m.

In the above-mentioned second method, the cut pieces are subjected to polishing mainly for the purpose of weight control. However, polishing of the glass mass in this invention (higher weight accuracy is obtained than that prior to polishing) is mainly intended for the above-mentioned objects (2) through (4). As compared with the second method, the amount removed by polishing in this invention is very small and the polishing time is as short as about a half. Furthermore, the amount removed by polishing can be reduced to thereby reduce the waste glass.

The polishing of the glass mass is preferably carried out by the use of barrel polishing. Specifically, the glass mass and an abrasive agent are put in a vessel. The vessel is rotated and/or vibrated. Alternatively, the interior of the vessel is stirred. In this manner, the surface of the glass mass can be uniformly polished. If a number of glass masses are put in the vessel to be subjected to barrel polishing, batch polishing is carried out in which a number of glass masses are polished in a single step. The barrel polishing is not intended for precision working of the profile of the glass mass. In other words, the barrel polishing is different from the polishing carried out in precision press-molding of the third method to approximate the configuration of the glass material to the configuration of the press-molded product as the final product.

The glass mass may have a surface defect such as flaws or striae which can be removed in the polishing step. Such defect can be removed by the above-mentioned polishing step of polishing the glass mass.

Reheating and Pressing Step

The glass masses obtained in the above-mentioned producing method are collectively press-molded by a plurality of molds having molding surfaces each of which corresponds to a final lens shape. It is to be noted that the mold comprises an upper die and a lower die, as known in the art. The press-molding is performed in an air atmosphere.

The glass mass heated to about 850° C. and softened ($10^5$ poises) is introduced by a loading unit onto the molding surface of the lower die heated to about 650° C. Then, the glass mass is press-molded for about 4–5 seconds by the upper die heated to about 650° C. like the lower die.

By this reheating and pressing step, a press-molded product having a shape approximate to that of a post-polished final product is obtained.

Polishing Step of Press-Molded Product

The press-molded product obtained by the above-mentioned reheating and pressing step is polished to obtain the optical glass as the final product. As a polishing agent, use is made of cerium oxide. Coarse polishing is at first performed, followed by fine polishing. By this polishing, those defects, such as striae, remaining in the surface layer portion of the press-molded product are completely removed. Since the variation in weight of the press-molded products is suppressed, the amount of polishing can be reduced. In the above-mentioned manner, it is possible to obtain various optical products such as a biconvex lens, a biconcave lens, a plano-convex lens, a plano-concave lens, a convex-meniscus lens, and a concave-meniscus lens.

The press-molded product obtained through the pressing step may include various surface defects such as flaws and striae which can be removed in the polishing step. These defects of the glass product can be removed by polishing the press-molded product.

In the glass mass forming step described above, use is made of the $SiO_2$-$TiO_2$ glass. However, the similar effect will be obtained if a $B_2O_3$-$La_2O_3$ glass is used.

By the use of the glasses No. 2 through No. 12 shown in Table 2, the above-mentioned steps are performed to obtain various optical products such as a biconvex lens, a biconcave lens, a plano-convex lens, a plano-concave lens, a convex-meniscus lens, and a concave-meniscus lens, like in case of the above-mentioned glass.

The molten glass 8 is gradually cooled while it is floated up on the molding die. However, the molten glass 8 may be directly received in the molding die. In this event, in order to suppress the occurrence of cracks due to the difference in temperature between the molding die and the glass, the molding die must be kept at a high temperature as compared with the floating technique.

Although continuous glass supply is performed by using the turntable and the nozzle in the foregoing description, intermittent glass supply may be performed.

In this invention, the glass masses suppressed in weight variation are press-molded so that the press-molded products small in weight variation can be formed. Thus, when the final products are obtained by polishing, polishing scrap can be reduced.

In the reheating step, pressing is performed at a viscosity on the order of $10^4$–$10^6$ poises. Therefore, the glass to be produced can be selected from a wide range of species. Furthermore, since the press-molding is possible in an air atmosphere, press-molding can be performed with a simple production facility.

In the method of producing the glass products according to this invention, polishing is carried out in the final step. This allows the glass mass to have such a surface condition that is removable in the polishing step. It is thus possible to shorten a time duration required in production of the glass mass directly produced from the molten glass. Therefore, the production cost of the glass products can be reduced.

In the method of producing the glass product according to this invention, polishing is carried out in the final step. This allows the glass mass to have such a surface condition that is removable in the polishing step. It is consequently possible to successively produce the glass masses. Accordingly, the production cost can be considerably saved as compared with the conventional method of cutting the glass block into the glass masses to be pressed.

In the method of producing the glass products according to this invention, pressing is carried out at a viscosity on the order between $10^4$ and $10^6$ poises. Therefore, as compared with the precision pressing at a high viscosity of $10^8$ poises or more, the deformation and the elongation of the glass upon pressing can be increased. Therefore, it is unnecessary to control the configuration of the glass material in conformity with the curvature of the molding surface of the mold as carried out in the precision press-molding. This allows the manufacture of the glass products of a wide variety of configurations.

In the method of producing the glass products according to this invention, the glass mass is reheated and pressed. Therefore, even if the molding surface of the lower die has a convex shape, the high-temperature molten glass dropping down is prevented from fusion with a body die surrounding the peripheral edge of the lower die. In the first method, the high-temperature molten glass is unstable on the lower die and may be brought into contact with the body die to cause fusion with the body die. Furthermore, the method of this invention is free from other various problems such that the molten glass is brought into contact with the body die to be rapidly cooled, resulting in insufficient elongation of the glass upon pressing, and that the glass is biased to the peripheral edge of the lower die upon pressing and does not uniformly spread throughout the mold.

Finally, comparison will be made about this invention and the third method mentioned so as to facilitate an understanding of this invention.

In this invention, the molding die 7 may have a rough surface having a maximum surface roughness Rmax equal to 10 μm or more.

On the other hand, it should be considered that, no polishing step is included, like in the third method, in a process from a step of molding the glass mass to a step of obtaining the final product, the molding surface of the molding die must have a maximum surface roughness Rmax equal to or less than 1 μm. This is because, if the molten glass is received on the molding die to form a glass blank to be pressed, contact between the molten glass and the molding die may take place.

In this invention, the maximum surface roughness of the molding surface of each mold used in press molding falls within a range between 1 and 20 μm, typically, between 1 and 10 μm.

On the other hand, in the third method, the shape and the surface precision of the molding surface must be accurately transferred to the final product in the pressing step. Therefore, the molding surface of the mold must have a maximum surface roughness Rmax on the order of 5 nm.

This shows that the molds for pressing used in this invention are completely different from those used in the third method. In the third method, even a small fracture on the molding surface has a serious adverse influence upon the surface accuracy of the final product. Therefore, in the third method, in order to prevent the small fracture on the molding surface due to the fusion between the glass and the mold, the glass must have a transition point lower than 560° C. or so.

On the other hand, in the pressing mold in this invention, even if small variation is present in shape of the molding surface, no such problem as in the third method will be caused because the pressed product is then subjected to polishing. Therefore, it is possible to use in this invention those glasses that have a transition point of 580° C. or more, that enable mass production, and that would not be used in the third method.

Figure 6A:
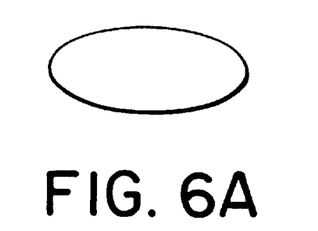
FIGS. 6A through 6D shows sectional shapes of the glass mass, a press-molded product, and a final product at different stages of production.
Figure 6B:
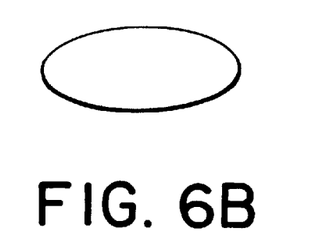
Figure 6C:
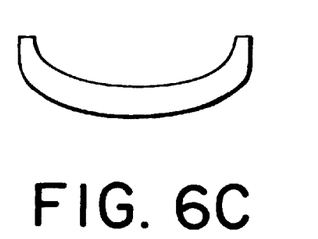
Figure 6D:
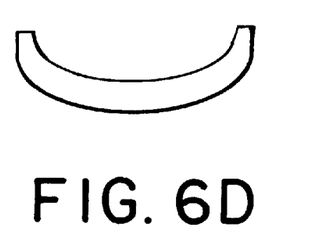

Referring to FIGS. 6A through 6D, the glass mass (FIG. 6A) obtained from the molten glass is successively processed as illustrated in FIGS. 6B to 6D. Specifically, the glass mass is subjected to barrel polishing, as shown in FIG. 6B, and is press-molded into a molded product (lens blank), as shown in FIG. 6C and polished into the final product (lens), as shown in FIG. 6D.

What is claimed is:

1. A method of producing final glass products, comprising:
   a glass mass forming step of forming glass masses fed through a nozzle by receiving a molten glass in a plurality of molding dies and gradually cooling said molten glass masses;
   a preliminary polishing step of preliminarily polishing the glass masses formed by the glass mass forming step by the use of a barrel polishing technique said preliminary polishing step increasing a roughness of the surfaces of said glass masses;
   a pressing step of reheating the preliminarily polished glass masses in an air atmosphere to a temperature corresponding to a viscosity of $10^4$–$10^6$ poises and press-molding said glass masses in an air atmosphere by a mold to produce press-molded products having a configuration approximate to the final glass products; and a polishing step of polishing said press-molded products to form final glass products;

wherein said pressing step is performed by applying a powdery parting agent on each surface of the glass mass and by reheating and press-molding said glass mass that has a surface roughness increased by the preliminary polishing step.

2. A method of producing final glass products, comprising:

a glass mass forming step of forming glass masses fed through a nozzle by receiving molten glass in a plurality of molding dies and gradually cooling said molten glass;

a preliminary polishing step of preliminarily polishing each of the glass masses formed by the glass mass forming step so that each surface of the glass masses is roughened;

a pressing step of reheating the preliminarily polished glass masses in an air atmosphere to a temperature corresponding to a viscosity of $10^4$–$10^6$ poises after applying a powdery parting agent on each surface of the glass masses and press-molding the glass masses in an air atmosphere with the powdery parting agent applied by a mold to produce press-molded products having a configuration approximate to the final glass products; and a polishing step of polishing said press-molded products to form final glass products.

3. A method as claimed in claim 1, wherein the glass masses are formed on their free surfaces in the glass mass forming step.

4. A method as claimed in claim 2, wherein the glass masses are formed on their free surfaces in the glass mass forming step.

5. A method as claimed in claim 1, wherein each glass mass is formed by glass having a glass transition point Tg not lower than 580° C.

6. A method as claimed in claim 2, wherein each glass mass is formed by glass having a glass transition point Tg not lower than 580° C.

7. A method as claimed in claim 1, wherein said final glass products are optical products.

8. A method as claimed in claim 2, wherein said final glass products are optical products.

9. A method of producing press-molded products which are to be finished into final glass products by final polishing and which are manufactured from glass masses, the press-molded products therefore having shapes different from the final glass products and therefore needing the final polishing, said method comprising the steps of:

a glass mass forming step of successively and individually receiving a predetermined weight of molten glass on each of a plurality of molding die to successively form a glass mass;

a preliminary polishing step of preliminarily polishing the glass masses formed by the glass mass forming step at a time by the use of a barrel polishing technique to roughen each surface of the glass masses;

distributing the preliminarily polished glass masses to molds in an air atmosphere;

applying a powdery parting agent on the surfaces of each preliminarily polished glass masses, and successively press-molding the preliminarily polished glass masses in an air atmosphere reheated to a temperature corresponding to a viscosity between $10^4$ and $10^6$ poises to thereby obtain the press-molded products approximate to the final glass products.

10. A method of producing press-molded products which are to be finished into final glass products by final polishing and which are manufactured from glass masses, the press-molded products therefore having shapes different from the final glass products and therefore needing the final polishing, said method comprising the steps of:

a glass mass forming step of successively forming glass masses by receiving molten glass in a plurality of molding dies and gradually cooling said molten glass;

a preliminary polishing step of preliminarily polishing each of the glass masses formed by the glass mass forming step so that each surface of the glass masses is roughened; and a pressing step of reheating the preliminarily polished glass masses in an air atmosphere to a temperature corresponding to a viscosity of $10^4$–$10^6$ poises after applying a powdery parting agent on each surface of the glass masses and press-molding the glass masses in an air atmosphere with the powdery parting agent applied by a mold to produce the press-molded products having a configuration approximate to the final glass products.

11. A method of producing final glass products finished by final polishing, comprising:

a glass mass forming step of forming glass masses fed through a nozzle by successively receiving a molten glass in a plurality of molding dies and gradually cooling said molten glass;

a preliminary polishing step of preliminarily polishing the glass masses formed by the glass mass forming step at a time by the use of a barrel polishing technique to roughen at least a surface of the glass masses; and a reheating step of reheating the preliminarily polished glass masses in an air atmosphere to a temperature corresponding to a viscosity of $10^4$–$10^6$ poises; and a press-molding step of press-molding the preliminarily polished glass masses in an air atmosphere by a mold, with a powdery parting agent applied on each surface of the preliminarily polished glass masses, to produce press-molded products approximate in configuration to the final glass products.

12. A method of producing final glass products finished by final polishing, comprising:

a glass mass forming step of forming glass masses fed through a nozzle by receiving molten glass in a plurality of molding dies and gradually cooling said molten glass;

a preliminary polishing step of preliminarily polishing each of the glass masses formed by the glass mass forming step so that each surface of the glass masses is roughened; and a pressing step of reheating the preliminarily polished glass masses in an air atmosphere to a temperature corresponding to a viscosity of $10^4$–$10^6$ poises after applying a powdery parting agent on each surface of the glass masses and press-molding the glass masses in an air atmosphere with the powdery parting agent applied by a mold to produce press-molded products having a configuration approximate to the final glass products.

\* \* \* \* \*